Sept. 9, 1958  C. E. KRAUS  2,850,910
VARIABLE SPEED POWER TRANSMISSION MECHANISMS
Filed March 12, 1954  2 Sheets-Sheet 1
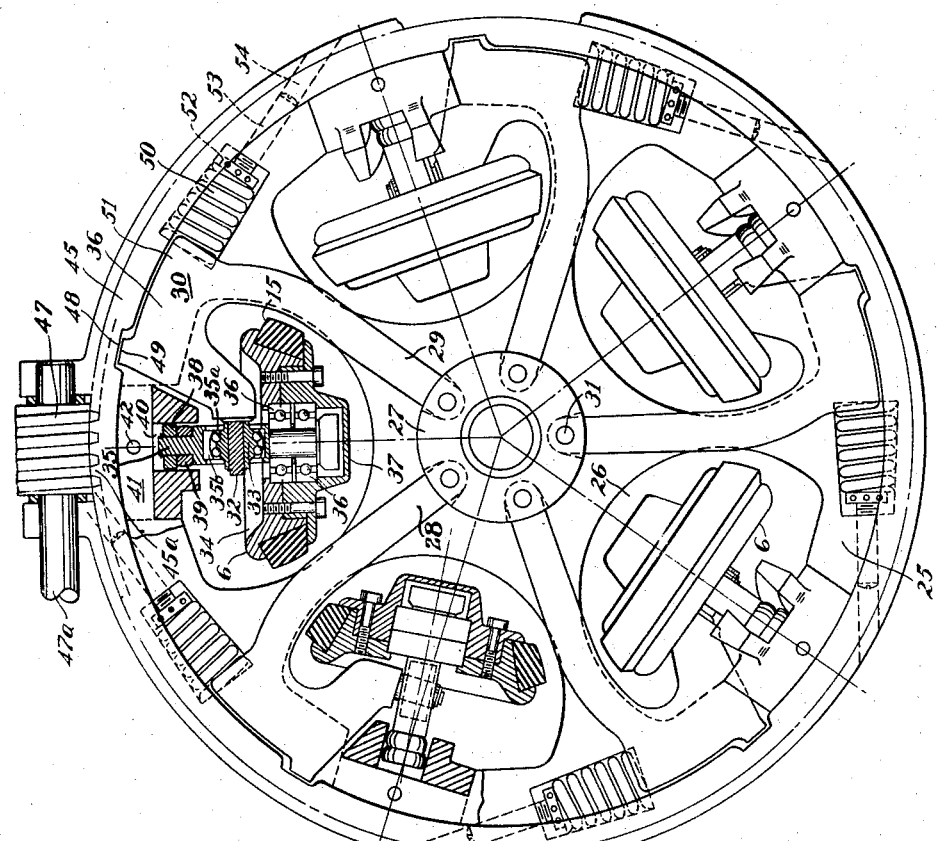
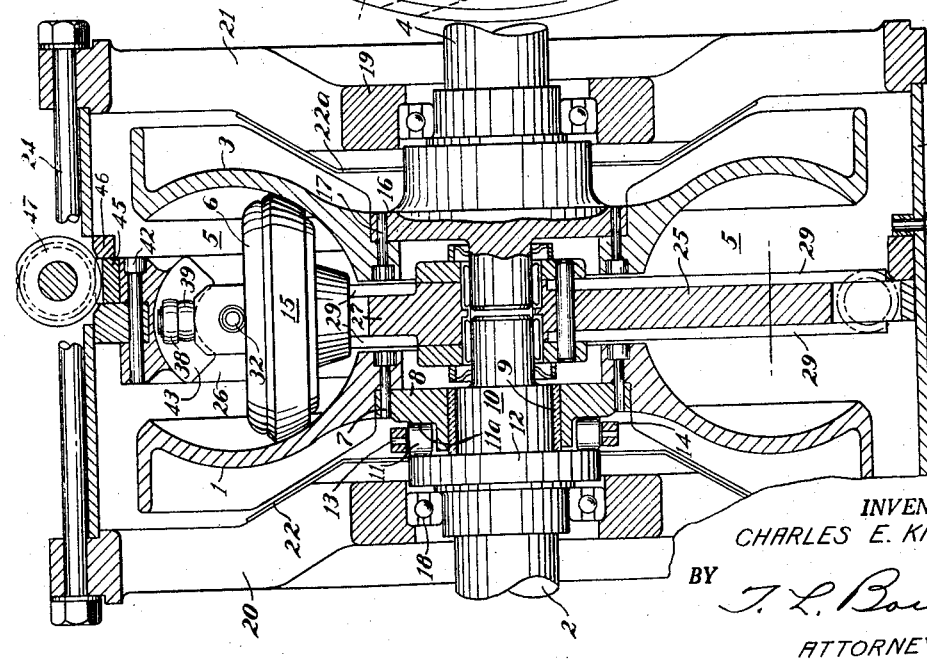
INVENTOR.
CHARLES E. KRAUS
BY
ATTORNEY Sept. 9, 1958 C. E. KRAUS 2,850,910
VARIABLE SPEED POWER TRANSMISSION MECHANISMS
Filed March 12, 1954 2 Sheets-Sheet 2
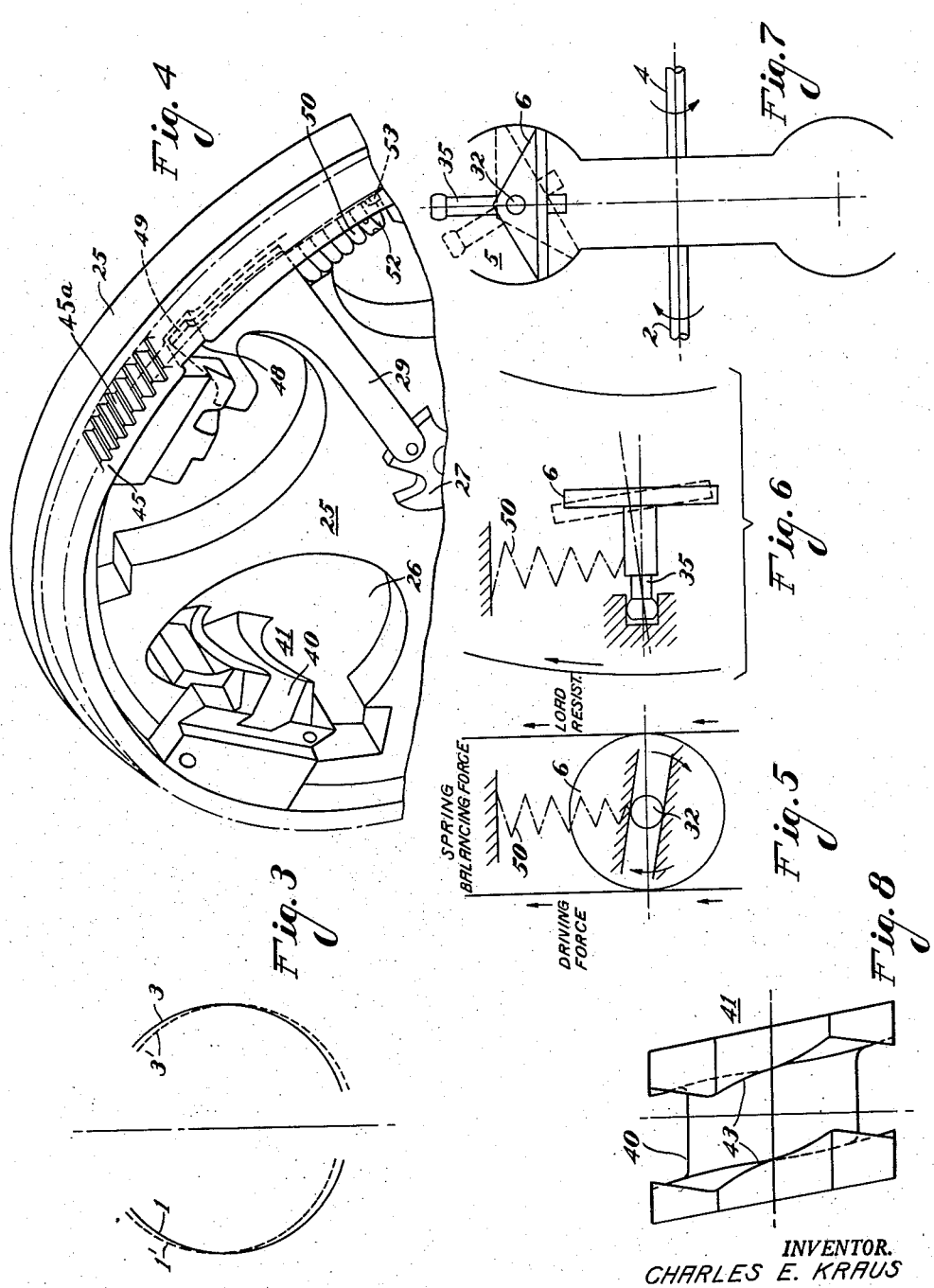
INVENTOR.
CHARLES E. KRAUS
BY *J. L. Bowes*
ATTORNEY United States Patent Office 2,850,910
Patented Sept. 9, 1958

2,850,910

VARIABLE SPEED POWER TRANSMISSION MECHANISMS

Charles E. Kraus, Rochester, N. Y., assignor to Excelermatic, Inc., a corporation of New York Application March 12, 1954, Serial No. 415,716

14 Claims. (Cl. 74—190.5)

This invention relates to variable speed power transmission mechanisms.

It is an object of this invention to provide new and improved variable-speed power transmission means of the torus type.

It is another object of this invention to provide a new and improved speed changer in which the speed ratio is automatically variable in accordance with torque requirements.

A further object of this invention is to provide a new and improved automatic fully torque-responsive speed changer which is reliable and positive in operation.

Yet another object of this invention is to provide a speed changer of the torus type which is equally useful for fixed or mobile power requirements such as industrial applications or automotive vehicles, respectively, for example; which has improved power transmission characteristics; and which includes simple and positive means for readily changing speed ratios.

Still another object of this invention is to provide a power transmission device having automatic torque responsive ratio changing means independent of speed or the necessity for outside controls.

In accomplishing the foregoing objects, there is employed a pair of toric driving and driven elements with interposed motion transmitting friction rollers. The axes of the rollers are pivotably mounted at points to one side of the centerline of the forces applied to the rollers in order to obtain a force couple on the roller axis proportional to the loads on the rollers and, therefore, proportional to the total load on the speed changer. The roller shafts are independently resiliently mounted, and stationary helical grooves are provided for the outer ends of the roller shafts to return the roller shafts to predetermined radial positions during precessing under changing load conditions.

Further objects and advantages of this invention will be apparent from the following specification and accompanying drawings in which Fig. 1 is a longitudinal sectional view of a torus type speed changer embodying the principles of my invention, Fig. 2 is a transverse sectional view of the device of Fig. 1, Fig. 3 represents in diagrammatic form a modified torus configuration, Fig. 4 is an enlarged partial view of the device of Figs. 1 and 2 illustrating details of my invention, Figs. 5, 6, and 7 are diagrams helpful in understanding my invention, and Fig. 8 illustrates another detail of my invention, i. e., a suitable configuration for a part of the device of Figs. 1 and 2.

In the drawings there is shown a toric driving element 1 suitably carried by input or driving shaft 2 and an oppositely disposed coaxially positioned toric driven element 3 carried by driven or output shaft 4. As illustrated, elements 1 and 3 are mounted on adjacent ends of shafts 2 and 4 and have corresponding toroidal grooves so that elements 1 and 3 define an annular chamber 5 which is generally circular in cross-section.

In order to transmit motion from element 1 to element 3, and hence between shafts 2 and 4, there is provided a plurality of friction rollers 6 contacting the opposed faces of elements 1 and 3 and mounted for rotation within chamber 5.

Thus, as shaft 2 is rotated, the similar rotation of element 1 causes rotation of rollers 6, which in turn cause rotation of element 3 and shaft 4 in the opposite direction from shaft 2.

In the arrangement shown in Figs. 1 and 2, element 1 is not rigidly secured to shaft 2 but is driven by a sprag system. While any sprag system known to the art may be employed, there is illustrated an embodiment in which element 1 is secured, as by screws or rivets, for example, to a flanged ring 8 which is free to move circumferentially on bushing 9 which is secured to portion 10 of shaft 2. Sprags or rollers 11 are disposed between cam surface 11a of ring 8 and shoulder 12 of shaft 2.

In order to maintain rollers 11 in proper position, each roller is provided with an axle 13 suitably journalled in a retaining ring 14. Cam surface 11a is arranged so that as the output load increases the rollers or sprags 11 force ring 8 and element 1 axially toward element 3, thereby increasing the force on rollers 6. By providing the outer surfaces of rollers 6 with resilient surfaces, as for example, by means of rubber tires 15, the frictional engagement between elements and rollers is increased and slippage therebetween is minimized.

The resilient tire 15 is preferably generally trapezoidal in cross-section. It will be noted that the circumferential face approximates a conical section so that the conically disposed surface approximates a bevel drive in all positions of the rollers within chamber 5.

Toric element 3 is securely fastened to hub 16 of shaft 4 in any suitable manner as by means of screws or rivets indicated by the numeral 17.

Shafts 2 and 4 may be mounted for rotation in any suitable way. While there is shown an embodiment in which shafts 2 and 4 are journalled in hubs 18 and 19, respectively, of spiders 20 and 21, respectively, the apparatus may be enclosed if desired. A cylindrical casing 23 completes the enclosure. The spiders 20 and 21 and casing 23 may be held together as by bolts 24.

In order to provide suitable cooling, fans 22 and 22a may be carried by shafts 2 and 4, respectively, in order to conduct air through suitable openings in spiders 20 and 21 and the parts enclosed within casing 23.

Means is provided for supporting rollers 6 in operative relationship with respect to elements 1 and 3. For this purpose there is provided a transverse plate 25 having a plurality of generally semi-circular openings 26 within which rollers 6 are positioned. Plate or member 25 has a central hub portion 27 having a central bore into which extend the inner ends of shafts 2 and 4. Member 25 may be secured in any desired manner, as by screws (not shown) extending through openings in casing member 23 into suitable engagement with member 25.

Each roller is carried from the outer end of a bifurcated member or carrier 28 which resembles the letter J in side view and has spaced apart arms 29 disposed on either side of hub 27 and an end portion 30. Arms 29 are pivotally attached to hub 27 by suitable pivots 31. Each end or outer portion 30 carries a laterally extending stub shaft 32 having a generally round bearing portion 33, the center line of shaft 32 intersecting the center of the torus circle or chamber 5.

Each roller 6 is recessed as indicated by the numeral 34 and is rotatably mounted on radially extending pins or shafts 35 by means of suitable bearings 36 maintained in place by retaining means 37. Shafts 35 are provided with openings 35a for receiving ball bearing assembly 35b. The bearing mounting thus described provides a universal bearing mounting for the associated roller whereby the shaft 35 is pivotably carried by shaft 32. In order to obtain maximum efficiency the parts are arranged so that the center line of the forces between the friction faces of roller 6 is displaced toward the axis of shafts 2 and 4 from the supporting axis (shaft 32).

Referring to Figs. 1 and 7, it is noted that rollers 6 may be moved or pivoted about stub shaft 32. As is well understood by those skilled in the art, the speed ratio between shafts 2 and 4 is dependent on the position of rollers 6 with respect to elements 1 and 3.

Reference to Figs. 1 and 2 brings out that shafts 35 terminate in a pair of rollers 38 and 39 which are received in a slot or groove 40 in a block 41 suitably secured to plate 25 as by screws 42. The opposing faces 43 of groove 40 are preferably helically disposed in order to correct the tilt of the rollers 6 in a plane perpendicular to shafts 2 and 4 as the precessing action rotates the roller axis during changes of load.

Means is provided for pre-setting the speed ratio of the apparatus described herein. An annular ring 45 is supported for rotation between plate 25 and a ring 46 secured to or integral with the inner surface of casing member 23. The outer circumference of ring 45 is provided with gear teeth 45a (only a few of which are shown) engaged by worm wheel 47 to which motion may be imparted by suitable control means including shaft 47a on which gear 47 is secured. On the inner surface of ring 45, there is provided a plurality of notches or recesses 48 to receive portions 49 extending radially from portions 30 of members 28. Thus members 28 are moved clockwise or counter-clockwise about pivots 31 as ring 45 is rotated under the control of worm 47 and gear teeth 45a. The foregoing control means for the roller pivot arms or members 28 limits the maximum speed ratio but permits torque responsive action for lower ratios.

Members 28 are biased in a counter-clockwise circumferential direction (as viewed in Fig. 2) by non-linear resilient means such as conical springs 50 disposed between shoulders 51 of member 28 and the ends of recesses 52 in plate 25. The tension of springs 50 may be adjustable as by means of threaded members 53 disposed in suitably threaded bores 54, thereby enabling the torque-responsive character of the apparatus to be pre-set. By suitable choice of springs and tension, the input torque can be held substantially constant throughout the ratio range with changes in output torque.

The diagrams shown in Figs. 5, 6, and 7 are useful in understanding the operation of the illustrated transmission. Let it be assumed that the parts are in the positions shown in solid lines. Referring to Fig. 5, the driving force and load resistance are in balance as indicated by the vertical arrows. The curved arrows indicate the direction of rotation of roller 6. Now, if it be assumed that the load is suddenly increased, roller 6 moves into a position such as that indicated by the dashed lines of Figs. 6 and 7, for example. Referring to Fig. 5, the increased load resistance tends to cause roller 6 to move upwardly against the balancing force of spring 50. Referring to Fig. 6, shaft 35 is caused to tilt (as also indicated in the left hand portion of Fig. 2). Referring to Figs. 7 and 1, as rollers 6 and shaft 35 move to the dashed position, rollers 38 and 39 (indicated as single rollers in Figs. 6 and 7 for simplification) follow the helically disposed surfaces 43 and effect a return of shaft 35 to the solid position of Fig. 6. However, roller 6 rotates counter-clockwise of stub shaft 32 to the new dashed position of Fig. 7 to a new speed ratio.

In the case of a reduction of load, the opposite effect is produced in the system, rollers 6 moving clockwise (in Figs. 1 and 7) to a new and higher speed ratio.

In the embodiment of Figs. 1, 2, and 4-7, a true circular chamber 5 is shown, the additional contact pressure being obtained with heavy loads being accommodated by a sprag system, as previously explained. In Fig. 3 there is shown a modification in which the cross-section of chamber 5 departs from a true circle whereby load increases cause rollers 6 to move to positions where relative wedging takes place. This result is accomplished by forming the torus surfaces in such a way that the surfaces are closer together at relatively high speed reduction ratios and relatively farther apart at relatively low speed reduction ratios. The two sections are indicated by solid lines 1 and 3 and dashed lines 1' and 3'. With this arrangement, suitable contact loading is obtained for different ratio positions of the rollers 6.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What I claim is:

1. In a variable speed power transmission device of the torus type comprising axially aligned driving and driven shafts carrying oppositely disposed toric driving and driven elements, respectively, and a plurality of rollers in driven and driving engagement with said elements, means for obtaining automatic fully torque-responsive speed ratio changing independent of speed and external controls comprising radially disposed shafts for rotatably carrying each of said rollers, means for pivotally mounting said carrying shafts so that the outer ends of said carrying shafts are permitted to move in a plane normal to the axis of the driving and driven shafts whereby said rollers are permitted to move angularly with respect to said elements in order to change said speed ratio, and means providing a stationary groove receiving the outer ends of said carrying shafts for controlling the amount of said angular movement of said rollers during changes of load on said device whereby said device is automatically torque responsive.

2. The device of claim 1 wherein the outer ends of said carrying shafts carry rollers engaging the sides of said groove.

3. The device of claim 2 wherein said rollers are of different diameters.

4. The device of claim 1 together with resilient means individual to each roller carrying means for urging said roller carrying means circumferentially.

5. The device of claim 4 in which said resilient means have non-linear deflection characteristics.

6. The device of claim 4 together with means for adjusting the effective force of said resilient means.

7. In a variable speed transmission device having a toric driving element, an oppositely disposed toric driven element coaxial therewith, friction rollers between and in driving engagement with said elements, means for mounting said rollers for said engagement, said mounting means providing for pivotal movement of said rollers relative to said elements thereby enabling variation of the speed ratio between said elements, the point of pivotal movement of said rollers being offset from a line drawn through the areas of engagement between said rollers and said toric members, the improvement which comprises a fixed transverse member having a plurality of openings for the individual accommodation of said rollers, a carrier member for each roller each of said carrier members having an inner portion and an outer portion, said inner portions being pivotally supported with respect to said transverse member, said outer portions having a laterally extending stub shaft; said stub shafts including a bearing portion for supporting said carrying shafts.

8. The device of claim 7 in which said inner portion is bifurcated whereby an arm extends radially on each side of said transverse member.

9. The device of claim 7 together with resilient means for urging each of said outer portions circumferentially.

10. The device of claim 9 in which said resilient means comprise conical springs.

11. The device of claim 1 together with means for setting the torque response of said device.

12. The device of claim 11 provided with means for controlling the circumferential positions of said carrier members and hence the positions of said rollers relative to said toric members.

13. The device of claim 12 in which said controlling means is externally adjustable.

14. The device of claim 11 in which said setting means comprises a circumferential transverse ring, said ring having recesses in a face thereof, each of said outer portions of said carrier members having means engaging in one of said recesses, and means for varying the circumferential position of said ring.

References Cited in the file of this patent

UNITED STATES PATENTS

| | | |
|---|---|---|
| 1,856,249 | Hayes | May 3, 1932 |
| 1,904,046 | Hayes | Apr. 18, 1933 |
| 2,030,203 | Gove et al. | Feb. 11, 1936 |
| 2,057,136 | Criswell | Oct. 13, 1936 |
| 2,060,884 | Madle | Nov. 17, 1936 |
| 2,124,398 | Hayes | July 19, 1938 |
| 2,527,203 | Tippen | Oct. 24, 1950 |
| 2,619,841 | Von Kreudenstein | Dec. 2, 1952 |